J. BE GOLE.
HYDROCARBON MOTOR.
APPLICATION FILED JULY 19, 1917.
1,292,683.
Patented Jan. 28, 1919.
2 SHEETS—SHEET 2.
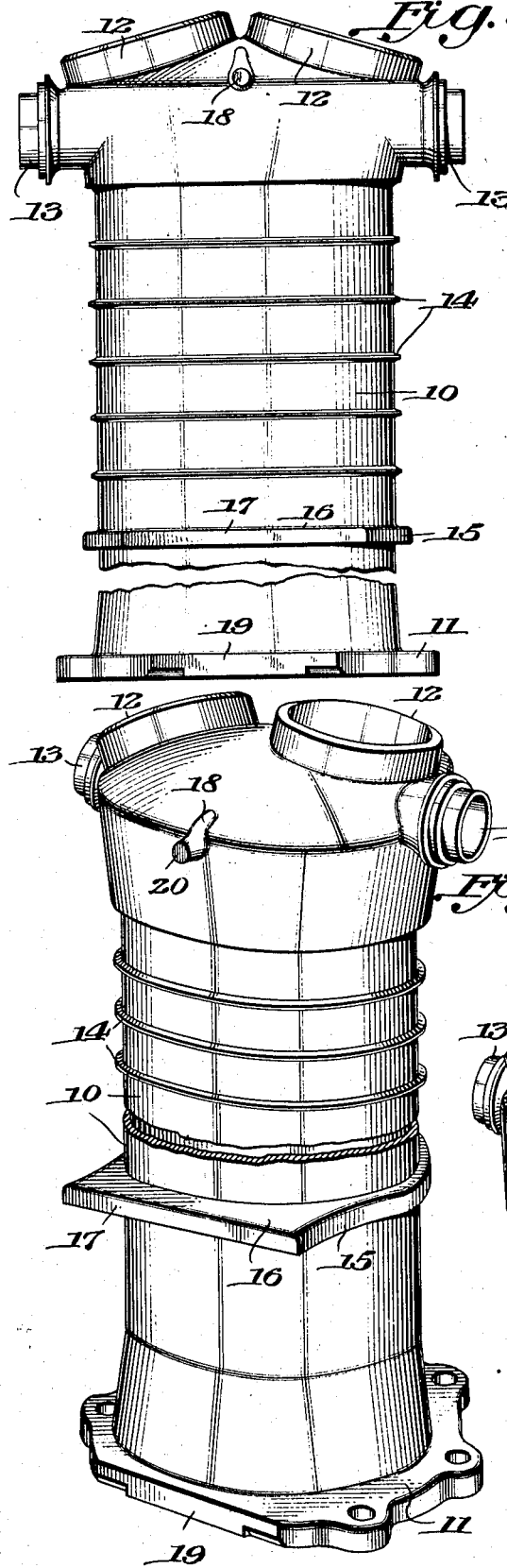
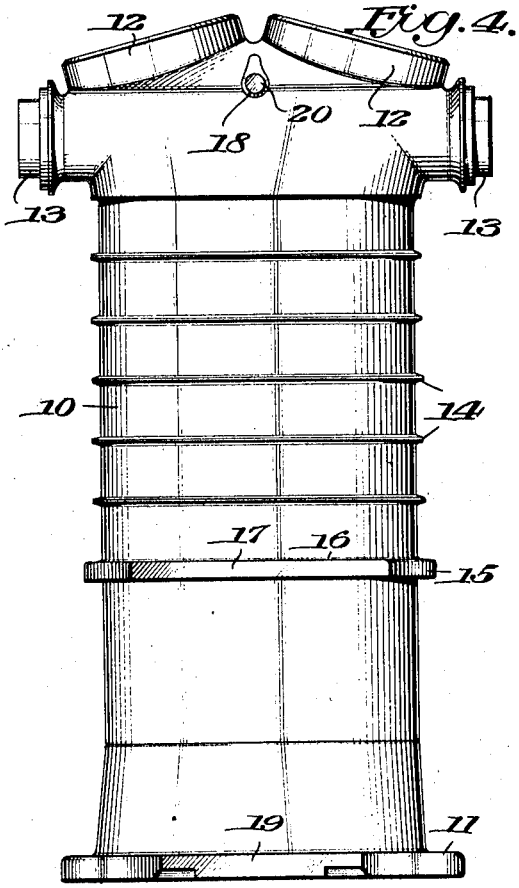
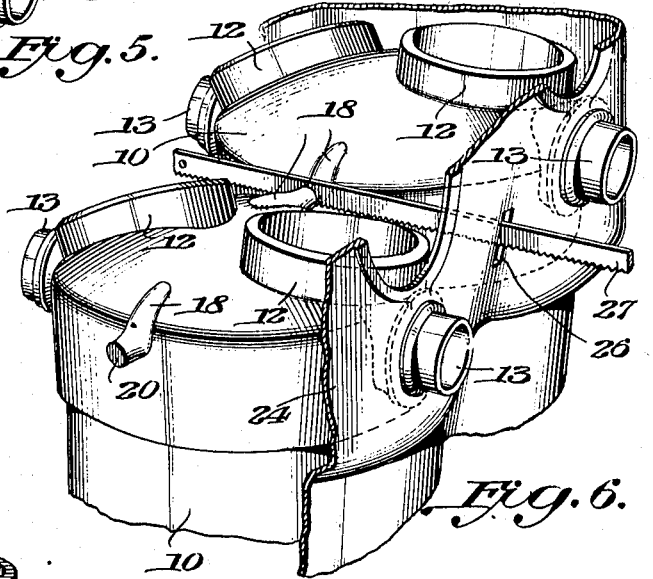
INVENTOR
James BeGole,
BY
ATTORNEY

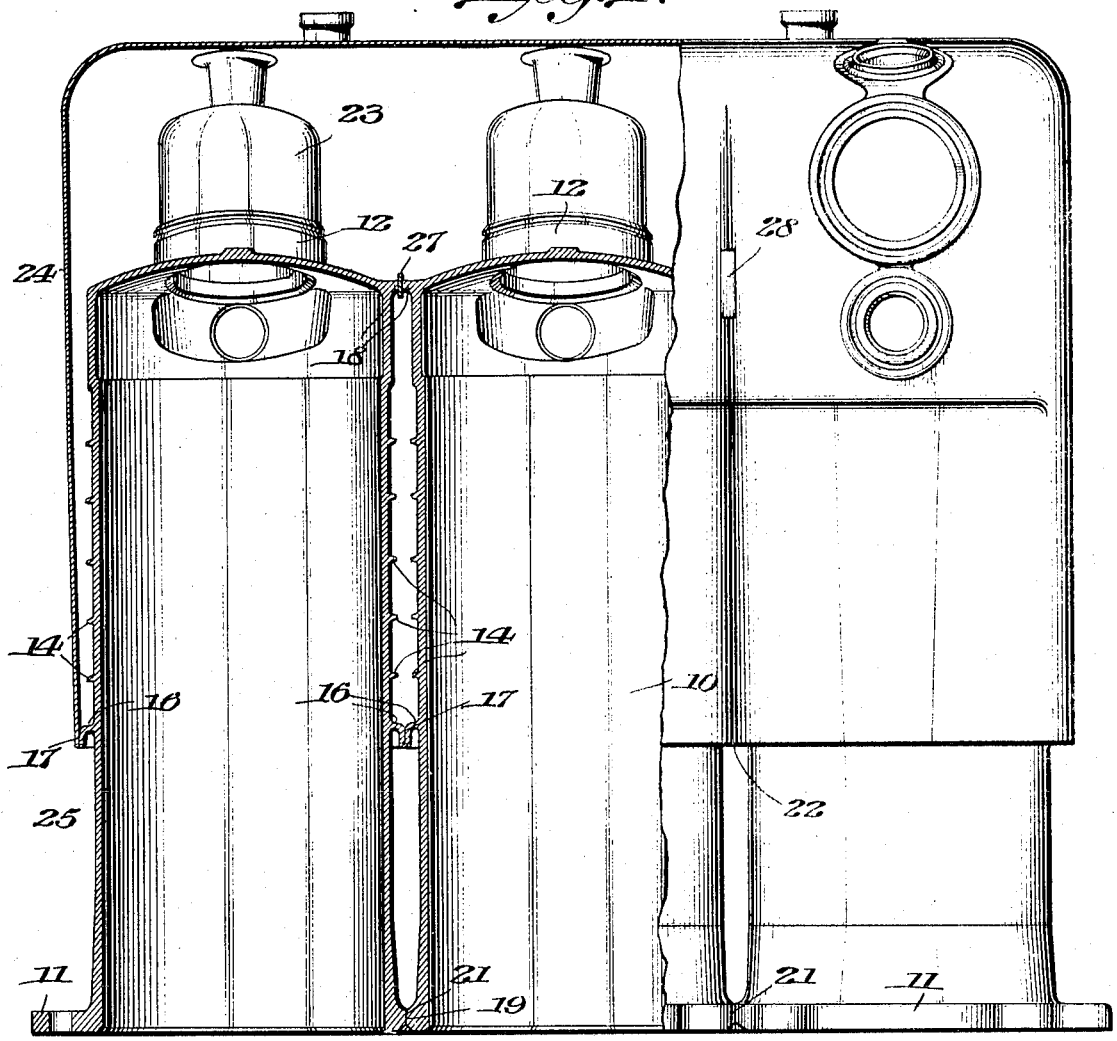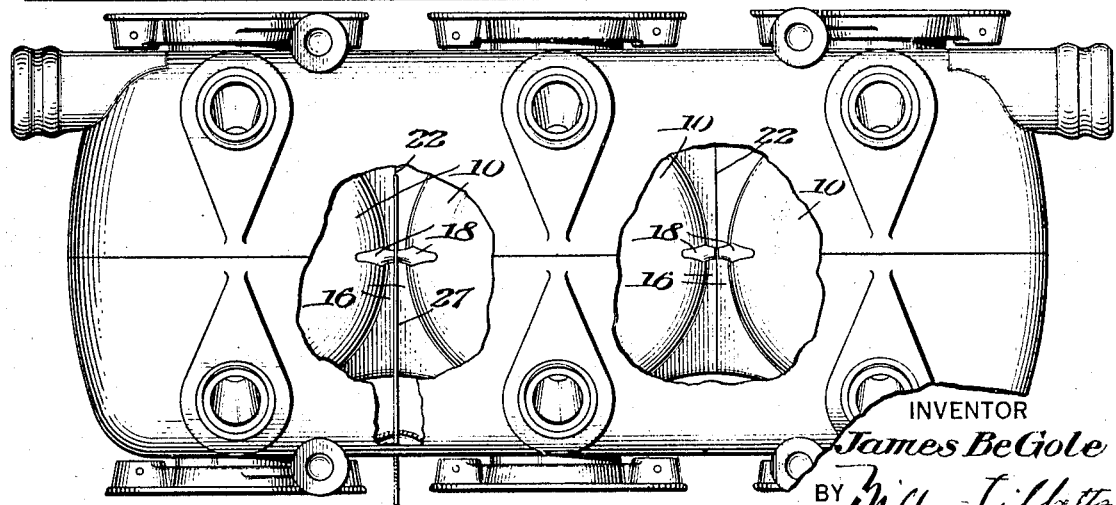

UNITED STATES PATENT OFFICE.

JAMES BE GOLE, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,292,683.　　　　　　　Specification of Letters Patent.　　　Patented Jan. 28, 1919.

Application filed July 19, 1917.　Serial No. 181,585.

*To all whom it may concern:*

Be it known that I, JAMES BE GOLE, a citizen of the United States, and resident of Detroit, Wayne county, State of Michigan, have invented certain new and useful Improvements in Hydrocarbon - Motors, of which the following is a specification.

This invention relates to hydrocarbon motors and particularly to a method of making cylinder blocks for hydrocarbon motors and to such blocks themselves.

One of the objects of the invention is to provide a method of making cylinder blocks that will insure accuracy in the positioning of the several cylinders of the block.

Another object of the invention is to provide a cylinder block made up of several cylinders having separated and alined abutting flanges welded together.

Other objects of the invention will appear from the following description taken in connection with the drawings which form a part of this specification, and in which:—

Figure 1 is a side elevation of a cylinder block made in accordance with this invention, parts being broken away to illustrate the interior construction;

Fig. 2 is a plan view of the block shown in Fig. 1, also with parts broken away;

Fig. 3 is an elevation of one of the cylinders for the block shown in Figs. 1 and 2, with the flange faces shown in rough;

Fig. 4 is similar to Fig. 3 except that the flange faces and positioning lug have been machined or planed off;

Fig. 5 is a perspective view of the cylinder shown in Fig. 4, and

Fig. 6 is a perspective view of the upper parts of two adjacent cylinders with parts of the water jackets cut away to illustrate the method of removing some of the metal from the ends of the positioning lugs, in accordance with this invention.

In making up cylinder blocks for hydrocarbon motors it is particularly essential that the cylinders shall be properly alined relative to each other. It is also desirable that the upper ends or heads of the cylinders should be somewhat free to expand relatively to the other cylinders, after the cylinder block is complete and assembled as a part of a motor. When such cylinder blocks are made up by welding parts of them together, the intense welding heat makes it very difficult to retain the cylinders in their correct relative positions. The present invention provides a method whereby the cylinders may be so retained relatively and a cylinder block is formed in which there are two spaced and alined welded joints between adjacent cylinders while the upper parts or heads of the cylinders are left free to independently expand or contract.

Referring to the drawings, one of the rough machined cylinders is shown at 10 in Fig. 3. At the base of the cylinder there is an attaching flange 11 and at the head end of the cylinder there are bosses 12 and 13 to which other parts of the cylinder block may be connected. The cylinder body has strengthening ribs 14 formed thereon, and intermediate the ends of the cylinder there is a flange 15, the greater part of which conforms to the wall of the cylinder, but a small part 16 of which extends radially somewhat farther than the remainder and has a comparatively flat face 17 formed on it. Also at the head end of the cylinder there is a positioning lug 18. For the purpose of positioning this cylinder relatively to the next adjacent cylinder which is made in the same form, the attaching flange 11, the intermediate flange 16, and the positioning lug 18, are all machined or planed off so that their faces lie in a single plane exactly parallel to the center line of the cylinder bore. These three surfaces are indicated at 19, 17, and 20 respectively in Figs. 4 and 5. Thus it will be seen that two such cylinders may be placed together with their respective surfaces 19, 17, and 20 in contact and the parallelism of the axes of the two cylinders will be assured. Three such cylinders are shown placed together in Figs. 1 and 2, it being understood of course that the middle cylinder has these three surfaces 19, 17, and 20 formed on each of its sides. The said three cylinders shown in Figs. 1 and 2 are, after being so placed together, secured together by welding the abutting portions of their respective flanges 11 and 15 as shown at 21 and 22 in said figures.

The cylinders are shown in Fig. 1 as having elbows 23 mounted on their heads, and a water jacket 24, which may if desired be formed in two parts welded together in the medium plane of the motor, is placed around the cylinders and secured as by welding to the elbows 23, as shown in Figs. 1 and 2, and to the flanges 15 of the cylinders as shown particularly at 25 in Fig. 1.

During all of these welding operations, in which of course considerable heat is applied to various parts of the cylinders, the heads are maintained in correct relative position by means of the positioning lugs 18 above referred to. After the cylinders have been connected together and the cylinder block made up as above described, it is desirable, as suggested herein, to leave the heads of the cylinders free to expand and contract relatively to each other. In the present invention this is accomplished by removing some of the metal from the ends of the lugs 18 so that they will thereafter remain out of contact. Referring to Fig. 6 it will be seen that a slit 26 is cut in the water jacket 24 approximately opposite the lugs 18 between two of the cylinders and a saw 27, or other suitable tool, is inserted through this slit and a cut is made between the ends of the abutting lugs 18. The saw 27 is also shown in section in Fig. 1, and in plan in Fig. 2, and it will be understood that after the saw has passed between the lugs and is withdrawn, there is a space at least the thickness of the saw between the lugs so that they are out of contact.

After this sawing operation the slit 26 may be closed by welding the edges together or by welding on a patch 28 as shown at the right in Fig. 1.

But a single form of the invention is shown and described herein. However it will be understood that other forms and modifications may be made without departing from the spirit or scope of the invention.

Having thus described my invention, what I claim and desire to secure by Letters Patent is:—

1. A method of making a cylinder block consisting in forming two cylinders each with a welding flange and a positioning lug, then welding the flanges of said cylinders together with the lugs in contact, and then removing some of the metal from the ends of said lugs so that they are out of contact.

2. A method of making a cylinder block consisting in forming two cylinders each with a positioning lug, then connecting said cylinders together by welding with the lugs in contact to relatively position the cylinders, and then removing some of the metal from the ends of said lugs so that they are out of contact.

3. A method of making a cylinder block for hydrocarbon motors, consisting in forming a plurality of cylinders each with an attaching flange at one end and a positioning lug at the other end, welding the flanges of adjacent cylinders together with the lugs in contact to relatively position the cylinders, and removing some of the metal from the ends of the lugs so that they are out of contact.

4. A method of making a cylinder block for hydrocarbon motors, consisting in forming a plurality of cylinders each with a positioning lug, welding a water jacket to said cylinders with the lugs in contact to relatively position the cylinders, and removing some of the metal from the ends of the lugs so that they will then be out of contact.

5. A method of making a cylinder block for hydrocarbon motors, consisting in forming a plurality of cylinders each with a positioning lug, welding a water jacket to said cylinders with the lugs in contact to relatively position the cylinders, cutting an opening in said jacket adjacent said lugs, removing some of the metal from the ends of the lugs by inserting a tool through said opening, and closing said opening in the water jacket.

6. A method of making a cylinder block for hydrocarbon motors, consisting in forming a plurality of cylinders each with an attaching flange at one end, and a positioning lug at the other end, then welding the flanges of adjacent cylinders together with the lugs in contact, then welding a water jacket to the cylinders, and then removing some of the metal from the ends of the lugs by inserting a tool through an opening in the water jacket.

7. A method of making a cylinder block for hydrocarbon motors, consisting in forming a plurality of cylinders each with an attaching flange at one end, a positioning lug at the other end, and a flange intermediate its ends, then welding the attaching and intermediate flanges of adjacent cylinders together with the lugs in contact to relatively position the cylinders, and then removing some of the metal from the ends of the lugs so that they are out of contact.

8. A method of making a cylinder block for hydrocarbon motors, consisting in forming a plurality of cylinders each with an attaching flange at one end, a positioning lug at the other end, and a flange intermediate its ends, then welding the attaching and intermediate flanges of adjacent cylinders together with the lugs in contact to relatively position the cylinders, then welding a water jacket to said intermediate flanges and other parts of the cylinders, and then removing some of the metal from the ends of the lugs by inserting a saw or other tool through an opening in the water jacket.

In testimony whereof I affix my signature.

JAMES BE GOLE.